United States Patent
Gao (10) Patent No.: US 10,103,636 B1
(45) Date of Patent: Oct. 16, 2018

(54) SINGLE-STAGE POWER CONVERTER WITH POWER FACTOR CORRECTION

(71) Applicant: DIALOG SEMICONDUCTOR INC., Campbell, CA (US)

(72) Inventor: Xiaolin Gao, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/712,024

(22) Filed: Sep. 21, 2017

(51) Int. Cl.
| | |
|---|---|
| H02M 1/42 | (2007.01) |
| H02M 3/335 | (2006.01) |
| H05B 41/285 | (2006.01) |
| H02M 3/158 | (2006.01) |

(52) U.S. Cl.
CPC ....... *H02M 3/33515* (2013.01); *H02M 1/425* (2013.01); *H02M 1/4258* (2013.01); *H02M 3/1582* (2013.01); *H02M 3/33523* (2013.01); *H05B 41/2853* (2013.01)

(58) Field of Classification Search
CPC ...... H02M 1/42; H02M 1/4208; H02M 1/425; H02M 1/4258; H02M 1/4266; H02M 3/335; H02M 3/33507; H02M 3/33523
See application file for complete search history.

(56) References Cited

U.S. PATENT DOCUMENTS

| | | | | |
|---|---|---|---|---|
| 7,548,028 B2* | 6/2009 | Ushijima | .......... | H02M 7/53838 315/128 |
| 8,305,004 B2* | 11/2012 | Shao | .................... | H02M 1/4225 315/209 R |
| 8,542,506 B2* | 9/2013 | Schluter | .................. | H02M 1/36 323/901 |
| 9,502,981 B2 | 11/2016 | Schaemann et al. | | |
| 2017/0012541 A1 | 1/2017 | Ye et al. | | |

OTHER PUBLICATIONS

Sun, Bosheng, "Increase power factor by digitally compensating for PFC EMI-capacitor reactive current," Analog Applications Journal, 2016, pp. 23-28, Texas Instruments, El Segundo, California/USA.

* cited by examiner

*Primary Examiner* — Gary L Laxton
(74) *Attorney, Agent, or Firm* — Haynes and Boone, LLP (57) ABSTRACT

Systems, methods, and apparatus for a circuit with power factor correction (PFC) are disclosed. In one or more embodiments, the disclosed method comprises providing, by a single-stage power converter, a delay in phase between a peak current command and a rectified input voltage such that a phase of a transformer current intentionally lags behind a phase of the rectified input voltage to maintain a power factor (PF) level and a total harmonic distortion (THD) level for the single-stage power converter. In one or more analog embodiments, a resistor and a capacitor are implemented into a conventional single-stage power converter to provide the delay in phase between the peak current command and the rectified input voltage. In one or more digital embodiments, a controller within a conventional single-stage power converter exclusively provides the delay in phase between the peak current command and the rectified input voltage.

20 Claims, 12 Drawing Sheets

100% dimming, Pout ≈ 82W

| | Vac | Iout(mA) | Vout(V) | Pin(W) | PF | THD% | eff |
|---|---|---|---|---|---|---|---|
| 60Hz | 90 | 1439 | 57 | 92 | 0.995 | 6.12 | 89.16% |
| | 100 | 1440 | 57 | 92.1 | 0.997 | 4.39 | 89.12% |
| | 110 | 1439 | 56.9 | 90.9 | 0.997 | 4.56 | 90.08% |
| | 120 | 1438 | 56.9 | 90.7 | 0.998 | 4.15 | 90.21% |
| | 130 | 1436 | 56.9 | 90.1 | 0.999 | 3.83 | 90.69% |
| | 140 | 1436 | 56.9 | 89.9 | 0.999 | 4.58 | 90.89% |
| | 150 | 1435 | 57 | 89.9 | 0.999 | 4.26 | 90.98% |
| | 160 | 1435 | 57 | 89.6 | 0.999 | 4.23 | 91.29% |
| | 170 | 1434 | 57 | 89.5 | 0.999 | 3.93 | 91.33% |
| 50Hz | 180 | 1434 | 57.1 | 89.8 | 0.998 | 3.32 | 91.18% |
| | 190 | 1435 | 57.1 | 89.7 | 0.997 | 3.56 | 91.35% |
| | 200 | 1436 | 57.1 | 89.8 | 0.996 | 3.93 | 91.31% |
| | 210 | 1440 | 57.1 | 90.1 | 0.995 | 3.38 | 91.26% |
| | 220 | 1443 | 57.1 | 90.2 | 0.993 | 3.14 | 91.35% |
| | 230 | 1444 | 57.1 | 90.3 | 0.991 | 3.15 | 91.31% |
| | 240 | 1446 | 57.1 | 90.4 | 0.988 | 3.47 | 91.33% |
| | 250 | 1446 | 57.1 | 90.3 | 0.985 | 3.88 | 91.44% |
| | 264 | 1448 | 57.1 | 90.5 | 0.979 | 4.56 | 91.36% |
| | 277 | 1449 | 57.1 | 90.6 | 0.973 | 5.07 | 91.32% |

FIG. 7A

50% dimming, Pout ≈ 38.5W

| | Vac | Iout(mA) | Vout(V) | Pin(W) | PF | THD% | eff |
|---|---|---|---|---|---|---|---|
| 60Hz | 90 | 710 | 54.4 | 43.13 | 0.998 | 4.34 | 89.55% |
| | 100 | 709 | 54.3 | 42.84 | 0.999 | 3.96 | 89.87% |
| | 110 | 713 | 54.3 | 42.89 | 0.999 | 4.2 | 90.27% |
| | 120 | 715 | 54.3 | 42.94 | 0.999 | 3.85 | 90.42% |
| | 130 | 715 | 54.3 | 42.9 | 0.997 | 3.63 | 90.50% |
| | 140 | 716 | 54.3 | 42.8 | 0.995 | 3.59 | 90.84% |
| | 150 | 716 | 54.3 | 42.8 | 0.992 | 3.55 | 90.84% |
| | 160 | 716 | 54.3 | 42.7 | 0.988 | 4.02 | 91.05% |
| | 170 | 716 | 54.2 | 42.7 | 0.982 | 4.15 | 90.88% |
| 50Hz | 180 | 716.5 | 54.2 | 42.7 | 0.982 | 3.8 | 90.95% |
| | 190 | 717 | 54.2 | 42.7 | 0.975 | 4.54 | 91.01% |
| | 200 | 717 | 54.2 | 42.7 | 0.968 | 5.5 | 91.01% |
| | 210 | 718 | 54.2 | 42.7 | 0.959 | 6.11 | 91.14% |
| | 220 | 718 | 54.2 | 42.8 | 0.949 | 6.96 | 90.92% |
| | 230 | 719 | 54.2 | 42.8 | 0.938 | 8.06 | 91.05% |
| | 240 | 719 | 54.2 | 42.9 | 0.926 | 9.18 | 90.84% |
| | 250 | 720 | 54.2 | 42.9 | 0.912 | 10.37 | 90.97% |
| | 264 | 721 | 54.2 | 43 | 0.893 | 12.17 | 90.88% |
| | 277 | 722 | 54.2 | 43.1 | 0.874 | 14.02 | 90.79% |

FIG. 7B

100% dimming, Pout ≈ 82W

| | Vac | Iout(mA) | Vout(V) | Pin(W) | PF | THD% | eff |
|---|---|---|---|---|---|---|---|
| 60Hz | 90 | 1444 | 57.36 | 92.9 | 0.977 | 11.61 | 89.16% |
| | 100 | 1432 | 57.1 | 91 | 0.972 | 12.72 | 89.85% |
| | 110 | 1431 | 57.03 | 90.5 | 0.974 | 12.94 | 90.18% |
| | 120 | 1430 | 56.99 | 90 | 0.977 | 12.71 | 90.55% |
| | 130 | 1430 | 56.96 | 89.7 | 0.978 | 14.1 | 90.81% |
| | 140 | 1429 | 57 | 89.6 | 0.982 | 12.73 | 90.91% |
| | 150 | 1428 | 57.05 | 89.4 | 0.983 | 12.97 | 90.13% |
| | 160 | 1428 | 57.06 | 89.3 | 0.984 | 13.65 | 91.24% |
| | 170 | 1428 | 57.09 | 89.3 | 0.989 | 12.2 | 91.29% |
| 50Hz | 180 | 1431 | 57.06 | 89.4 | 0.992 | 10.26 | 91.33% |
| | 190 | 1430 | 57.1 | 89.4 | 0.992 | 10.26 | 91.33% |
| | 200 | 1430 | 57.09 | 89.2 | 0.993 | 10.43 | 91.52% |
| | 210 | 1430 | 57.08 | 89.1 | 0.995 | 9.41 | 91.61% |
| | 220 | 1432 | 57.11 | 89.2 | 0.995 | 9.34 | 91.68% |
| | 230 | 1433 | 57.03 | 89.2 | 0.995 | 9.51 | 91.62% |
| | 240 | 1438 | 57.1 | 89.6 | 0.995 | 9.64 | 91.64% |
| | 250 | 1440 | 57.03 | 89.7 | 0.994 | 9.09 | 91.55% |
| | 264 | 1442 | 57.08 | 89.9 | 0.991 | 9.16 | 91.56% |
| | 277 | 1443 | 57.1 | 89.9 | 0.988 | 9.24 | 91.65% |

FIG. 7C

50% dimming, Pout ≈ 38.5W

| | Vac | Iout(mA) | Vout(V) | Pin(W) | PF | THD% | eff |
|---|---|---|---|---|---|---|---|
| 60Hz | 90 | 720 | 54.39 | 43.56 | 0.976 | 13.51 | 89.90% |
| | 100 | 718 | 54.38 | 43.3 | 0.98 | 13.45 | 90.17% |
| | 110 | 718 | 54.38 | 43.1 | 0.984 | 13.38 | 90.59% |
| | 120 | 719 | 54.38 | 43.02 | 0.987 | 12.76 | 90.89% |
| | 130 | 719 | 54.38 | 42.9 | 0.989 | 12.57 | 91.14% |
| | 140 | 721 | 54.39 | 43 | 0.991 | 12.41 | 91.20% |
| | 150 | 723 | 54.4 | 43.1 | 0.992 | 12.36 | 91.26% |
| | 160 | 723 | 54.4 | 43 | 0.992 | 12.25 | 91.47% |
| | 170 | 722 | 54.39 | 43 | 0.991 | 11.7 | 91.32% |
| | 180 | 724 | 54.41 | 43.1 | 0.993 | 9.58 | 91.40% |
| | 190 | 723 | 54.37 | 43 | 0.99 | 9.33 | 91.42% |
| | 200 | 724 | 54.38 | 43.1 | 0.986 | 9.33 | 91.35% |
| | 210 | 724 | 54.37 | 43.1 | 0.98 | 9.26 | 91.33% |
| | 220 | 724 | 54.38 | 43.1 | 0.974 | 9.36 | 91.35% |
| 50Hz | 230 | 725 | 54.4 | 43.1 | 0.966 | 9.09 | 91.51% |
| | 240 | 725 | 54.39 | 43.1 | 0.956 | 9.43 | 91.49% |
| | 250 | 725 | 54.41 | 43.1 | 0.945 | 9.66 | 91.29% |
| | 264 | 726 | 54.41 | 43.28 | 0.927 | 10.65 | 91.27% |
| | 277 | 727 | 54.45 | 43.37 | 0.91 | 11.7 | 91.27% |

SINGLE-STAGE POWER CONVERTER WITH POWER FACTOR CORRECTION

FIELD

The present disclosure relates to single-stage power converters. In particular, it relates to single-stage power converters with power factor correction (PFC) configured as flyback, buck-boost, and boost topologies that sense the input voltage to provide a command for peak current mode control.

BACKGROUND

There is an increasing demand for a high power factor (PF) (e.g., PF>0.9) and a low total harmonic distortion (THD) (e.g., THD<20 percent (%)) over wide output power ranges across universal line voltages (e.g., 90 to 277 volts alternating current (Vac)). It is well known in the art that the input electromagnetic interference (EMI) capacitors in a single-stage power converter play a negative role to PF and THD. The contribution from the EMI capacitors becomes significant when operating with a high line voltage and a low output power, and prevents the system from achieving satisfactory PF and THD.

Currently, there are two ways to achieve high PF and low THD in a single-stage power converter. One method is to use a closed-loop control to derive an on-time value for the power transistor, and apply the on-time value across the whole line period to realize a constant on-time control to achieve a high power factor. The second method is to sample the input voltage, and a closed-loop determines a multiplier (i.e. a constant). The multiplication of the sensed input voltage and the multiplier results in a current envelope that has the same phase as the input voltage. This peak current threshold envelope defines the power transistor peak current value. Further, this peak current threshold envelope follows the input voltage waveform. If the input voltage has little distortion on the alternating current (AC) input mains, this method results in high PF and low THD. Unfortunately, when operating at low output power levels, and especially at high line voltages, the EMI capacitors create signal distortion, thereby increasing the THD and decreasing the PF.

Historically, for single-stage power converters, PF and THD specifications focused on high load operating conditions, and the PF and THD specifications were less stringent at low load operating conditions. However, there is currently a desire to impose stricter PF and THD specifications for low load operating conditions, which is difficult for existing solutions to achieve.

As such, there is a need for an improved single-stage power converter design that provides high PF and low THD when operating with a high line voltage and a low output power.

SUMMARY

The present disclosure relates to a method, system, and apparatus for a single-stage power converter with power factor correction (PFC). In one or more embodiments, a method for a circuit with PFC comprises providing, by a combination of a resistor and a capacitor within a single-stage power converter, a delay in phase between a peak current command and a rectified input voltage such that a phase of a transformer current intentionally lags behind a phase of the rectified input voltage to maintain a power factor (PF) level and a total harmonic distortion (THD) level for the single-stage power converter.

In one or more embodiments, the resistor and the capacitor are both connected to an input voltage pin of a controller of the single-stage power converter. In at least one embodiment, the controller is an integrated circuit (IC) chip. In some embodiments, the method further comprises receiving, by the input voltage pin of the controller, an input line voltage.

In at least one embodiment, the resistor is external to a controller of the single-stage power converter. In one or more embodiments, the resistor is internal to a controller of the single-stage power converter. In some embodiments, the capacitor is connected to a start-up switch of the single-stage power converter.

In one or more embodiments, a method for a circuit with PFC, the method comprises providing, by a controller of a single-stage power converter, a delay in phase between a peak current command and a rectified input voltage such that a phase of a transformer current intentionally lags behind a phase of the rectified input voltage to maintain a PF level and a THD level for the single-stage power converter.

In at least one embodiment, the method further comprises receiving, by the controller, an input line voltage. In one or more embodiments, the controller provides the delay in phase between the peak current command and the rectified input voltage by delaying a phase of the input line voltage.

In one or more embodiments, the controller delays the phase of the input line voltage by operating as an adjustable analog-to-digital converter (ADC) with an adjustable sample-hold time that is used to sample the input line voltage after a certain delay in time, and to adaptively vary the delay in time to achieve optimal PF and THD based on operating conditions. In at least one embodiment, the controller delays the phase of the input line voltage by operating as an adjustable analog low-pass filter (LPF). In some embodiments, the controller delays the phase of the input line voltage by operating as an adjustable digital LPF.

In at least one embodiment, a circuit with PFC comprises a single-stage power converter. The circuit further comprises a combination of a resistor and a capacitor within the single-stage power converter to provide a delay in phase between a peak current command and a rectified input voltage such that a phase of a transformer current intentionally lags behind a phase of the rectified input voltage to maintain a PF level and a THD level for the single-stage power converter.

In one or more embodiments, a circuit with PFC comprises a single-stage power converter. The circuit further comprises a controller of the single-stage power converter to provide a delay in phase between a peak current command and a rectified input voltage such that a phase of a transformer current intentionally lags behind a phase of the rectified input voltage to maintain a PF level and a THD level for the single-stage power converter.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for a single-stage power converter with power factor correction (PFC). The system of the present disclosure allows for a high power factor (PF) and a low total harmonic distortion (THD) even when operating the signal-stage power converter with PFC with a high line voltage and a low output power. This is achieved by introducing a delay in phase between the peak current command and the rectified input voltage of a conventional single-stage power converter. The delay in phase compensates for the effects of the electromagnetic interference (EMI) capacitors of the single-stage power converter on the PF and THD.

The disclosed system employs an analog solution or a digital solution to introduce the delay in phase. In one or more embodiments, for the analog solution (refer to FIG. 5), an additional resistor (which may be internal or external to the controller) and an additional capacitor are implemented into a conventional single-stage power converter. The additional resistor and additional capacitor in effect form a resistor-capacitor (RC) circuit to produce the delay in phase.

In one or more embodiments, for the digital solution, the controller of a conventional single-stage power converter will exclusively provide the delay in phase. For the digital solution, there are three main digital solution embodiments of how the controller provides the delay in phase. In the first main digital solution embodiment (refer to FIG. 8), the controller will provide the functionality of an adjustable analog-to-digital converter (ADC) with an adjustable sample-hold time that is used to sample the input line voltage after a certain delay of time, and to adaptively vary the delay in time. In the second main digital solution embodiment (refer to FIG. 9), the controller will provide the functionality of an adjustable analog low-pass filter (LPF). And, in the third main digital solution embodiment (refer to FIG. 10), the controller will provide the functionality of an adjustable digital LPF.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to single-stage power converters, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

I. Conventional Single-Stage Power Converter

Figure 1:
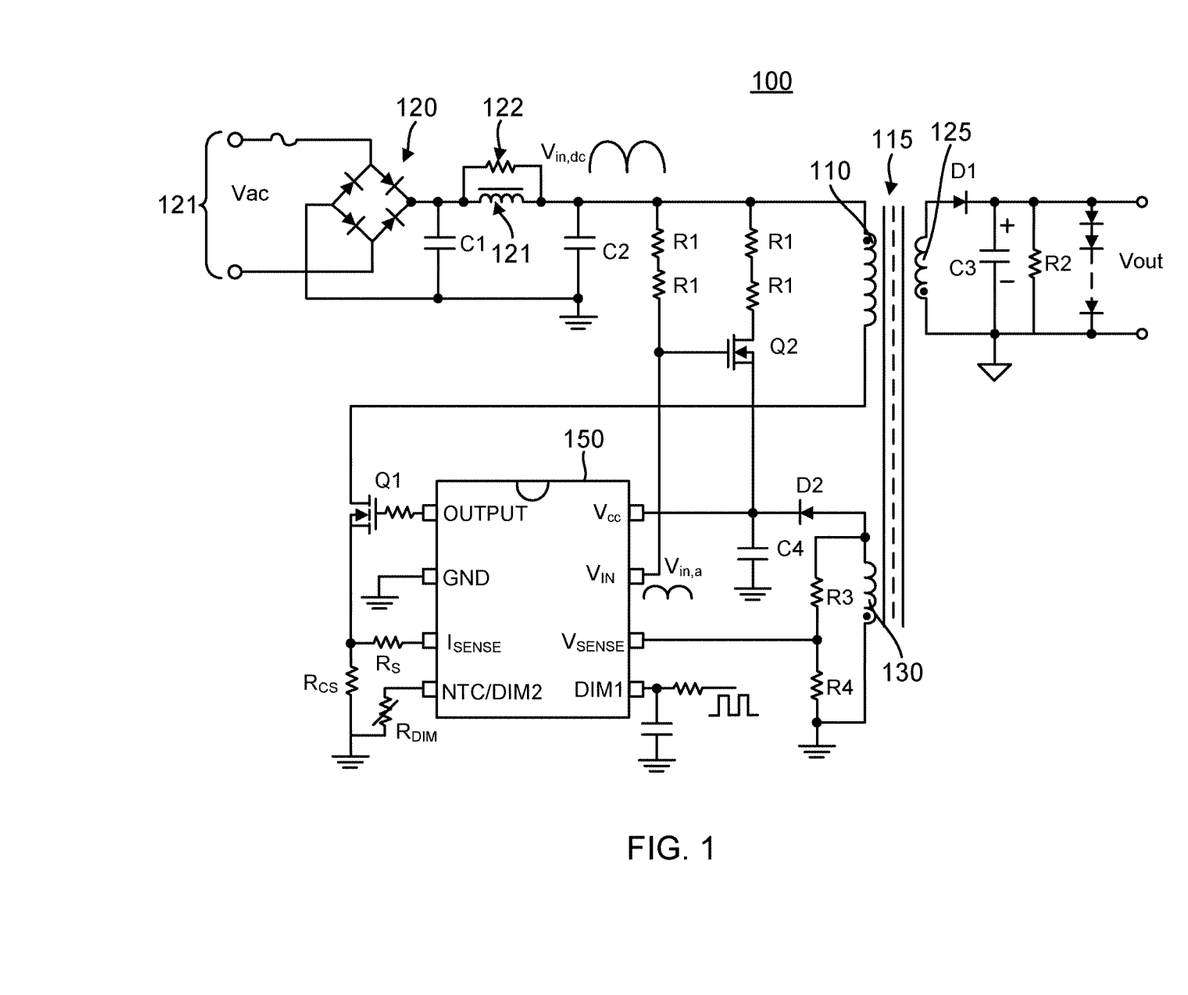
FIG. 1 is a diagram showing an exemplary conventional single-stage power converter.

FIG. 1 is a diagram showing an exemplary conventional single-stage power converter 100. In this figure, a flyback converter is depicted for the exemplary single-stage power converter 100. However, it should be noted that there are other types of conventional signal-stage power converters including, but not limited to, buck-boost converters and boost converters.

During operation of the conventional single-stage power converter 100, a rectifier including a diode bridge 120, a choke 121 in parallel with a resistor 122, and electromagnetic interference (EMI) capacitors C1 and C2 rectifies an alternating line voltage (Vac) carried on an AC main 121 to provide a rectified input voltage (Vin,dc). The rectified input voltage (Vin,dc) still retains a pronounced sinusoidal profile across each half of an AC main cycle. The input line voltage (Vin,a) is inputted into an input voltage pin (Vin pin) of a controller 150. The rectified input voltage (Vin,dc) also switches on a start-up switch Q2, such as an depletion-mode NMOS transistor, such that the start-up switch Q2 allows for the rectified input voltage (Vin,dc) to be inputted into a power pin ($V_{CC}$ pin) of the controller 150, thereby powering on the controller 150. In alternative embodiments, the start-up switch Q2 may be implemented using a bipolar junction transistor or an enhancement-mode NMOS transistor.

Once powered on, the controller 150 controls the switching of a power switch Q1, such as an NMOS transistor, by driving its gate through an output pin (OUTPUT pin). In alternative embodiments, the power switch Q1 may be implemented using a bipolar junction transistor. When switched on, the power switch Q1 allows a primary current to flow through a primary winding 110 of a transformer 115 responsive to the rectified input voltage (Vin,dc).

For each cycle of the power switch transistor Q1, the primary winding current ramps up from zero to a peak winding current value that depends upon the rectified input voltage (Vin,dc), the switch on time, and the inductance for primary winding 110. When the power switch transistor Q1 cycles off, a secondary winding current flows across a second winding 125 in the transformer 115, starting from a peak value and continuing to ramp down to zero. An output capacitor C3 stabilizes a resulting output voltage (Vout) produced by the second winding current. A diode D1 prevents the secondary winding current from flowing while the primary winding 110 conducts. Alternatively, diode D1 may be replaced by a transistor switch as is conventional for a flyback converter with synchronous rectification. The secondary winding current produces a reflected voltage across primary winding 110 and also across an auxiliary winding 130 for transformer 115. Diode D1 will have a voltage drop across it that prevents a direct relationship between the reflected voltage and the output voltage while the secondary current still flows. But when the secondary current just ramps to zero (i.e. the transformer reset time (Trst)), there is no voltage drop across diode D1. The resulting reflected voltage is directly related to the output voltage.

By indirectly sampling the output voltage at this transformer reset time, controller 150 performs primary-only feedback control of the output voltage. For example, controller 150 may include a voltage sense pin ($V_{SENSE}$ pin) that samples the reflected voltage across auxiliary winding 130 through a voltage divider formed by a pair of resistors R3 and R4. The reflected voltage may also be rectified through a diode D2 and a capacitor C4 to form a power supply voltage ($V_{CC}$) received by controller 150 at the power pin ($V_{CC}$ pin). Controller 150 may include a ground pin (GROUND pin) and a current sense pin ($I_{SENSE}$ pin) that samples the primary winding current through the voltage produced across a current sense resistor Rcs and a sampling resistor Rs coupled to power switch Q1. Additionally, controller 150 may include a negative temperature coefficient/dimmer 2 pin (NTC/DIM2 pin) that samples the voltage at this pin through a variable resistor $R_{DIM}$ to determine the NTC-based output current derating function or the desired dimming. Controller 150 may also include a dimmer 1 pin (DIM 1) pin to receive pulse width modulation (PWM) pulses indicating the desired dimming.

Figure 2:
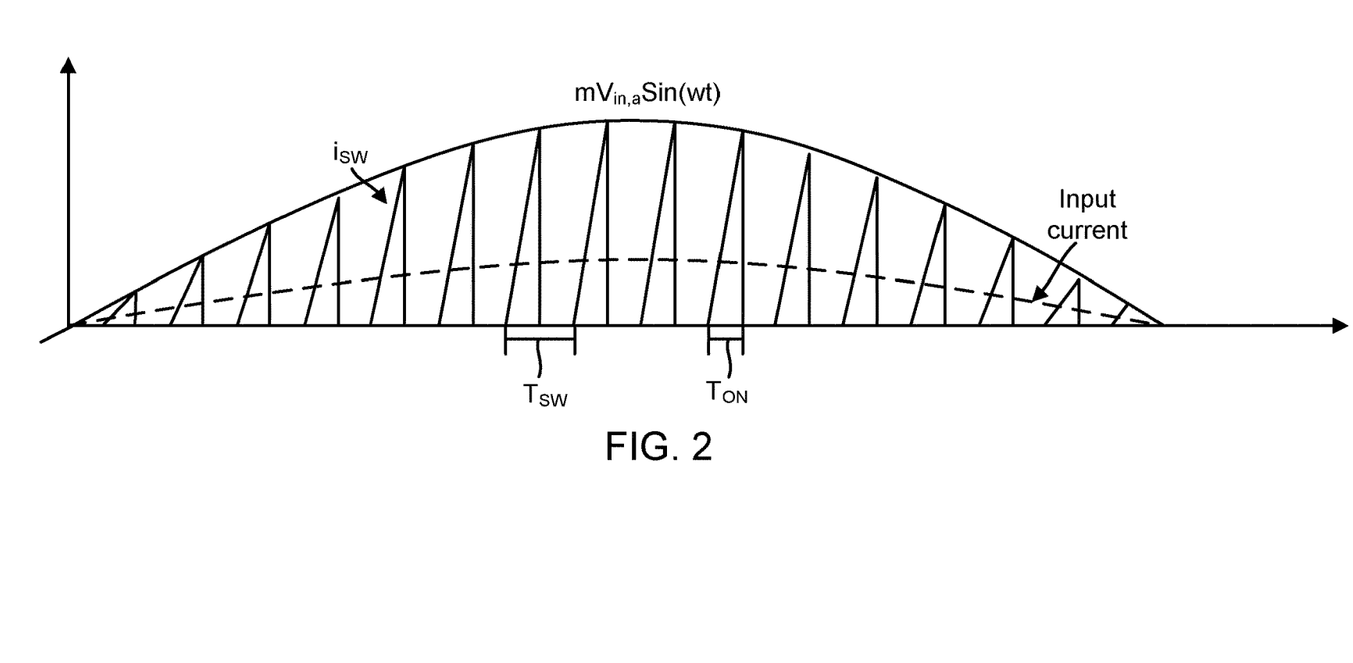
FIG. 2 is a graph showing the input current ($I_{in}$), the switch Q1 current ($I_{sw}$), and the peak current command of a conventional single-stage power converter over time.

FIG. 2 is a graph showing the input current ($I_{in}$), the switch Q1 current ($I_{sw}$), and the peak current command of a conventional single-stage power converter over time. In conventional single-stage power converters, conventionally the EMI capacitors C1 and C2 (refer to FIG. 1) are small and, as such, the rectified input voltage (Vin,dc) has a waveform that is close to sinusoidal in shape. Note that the waveform of (Vin,dc) is ideally sinusoidal in shape without the effects of C1 and C2.

Accordingly, the peak current command is also close to sinusoidal in shape, and is expressed as mVin,a Sin(ωt), where ω is equal to $2*\pi*(2*f_{line})$ and $f_{line}$ is the line frequency of the AC input, and m is a constant determined by the controller 150 (refer to FIG. 1). The controller 150 senses the input line voltage (Vin,a) on an input voltage pin (Vin pin), and the controller 150 operates as a closed-loop control by comparing the sensed output current ($I_{cal}$) on a current sense pin ($I_{SENSE}$ pin) with a reference current (Iref), internal to the controller 150, to determine a multiplier m, which is used to multiply the input sense signal (Vin,a Sin(ωt)) to generate the current command for peak current mode control (i.e. to generate the peak current command (mVin,a Sin(ωt)). The value for m is uniquely determined, depending on system information (e.g., input line voltage (Vin,a), output power, transformer 115 inductance, current sense resistor (Rcs) resistance, etc.).

For peak current mode control, the switch Q1 current ($I_{sw}$) ramps up linearly for every switching cycle, and hits the peak current command (mVin,a Sin(ωt)), as is shown in FIG. 2. The input EMI capacitors C1 and C2 filter out the high-frequency component of the switch Q1 current ($I_{sw}$) such that the low-frequency content remains as the input current ($I_{in}$), which is denoted by the dotted line shown in FIG. 2. A constant switching period of time for every switching cycle is denoted as Tsw on FIG. 2.

For a constant switching period (Tsw), the input current ($I_{in}$) can be readily derived by: $I_{in}$=0.5*m*Vin,a Sin(ωt)/(Rcs*(Tsw/Ton)), where Rcs is the current sense resistor (refer to FIG. 1) resistance, and Ton is the time period that the power switch Q1 is switched on (i.e. when the switch Q1 current ($I_{sw}$) is shown as rising in FIG. 2).

As shown in FIG. 2, the input current ($I_{in}$) is shown to have the same phase as the rectified input voltage (Vin,dc), and to also be close to sinusoidal in shape similar to the rectified input voltage (Vin,dc). As such, the power factor for the system is very high (e.g., close to 1.0, which is ideal).

However, in real applications, the EMI capacitors C1 and C2 (refer to FIG. 1) are constantly being charged and discharged during operation, and their current (i.e. Ic, which is equal to $I_{C1}$ (the current flowing through capacitor C1) added to $I_{C2}$ (the current flowing through capacitor C2)) leads the rectified input voltage (Vin,dc) by ninety (90) degrees, and is given by:

$$Ic=C(dVin,dc/dt)=\omega(C1+C2)V_{ac}\cos(\omega t), \quad\quad \text{(Equation E\_1)}$$

where C is equal to C1 (i.e. the capacitance of EMI capacitor C1)+C2 (i.e. the capacitance of EMI capacitor C2). Note that from the formula E_1, Ic is proportional to $V_{ac}$ and to the capacitance values of the EMI capacitors C1 and C2.

Figure 3:
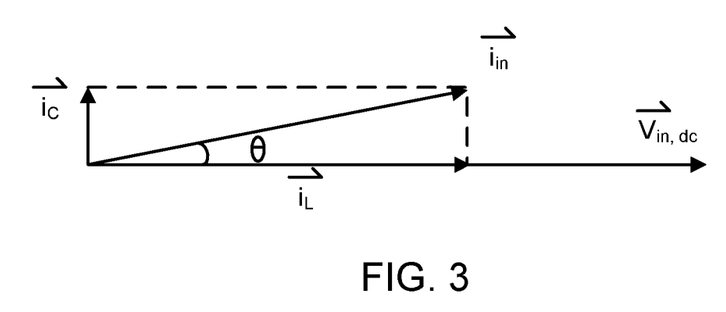
FIG. 3 is a vector diagram showing the input current ($I_{in}$) leading the rectified input voltage (Vin,dc) in phase by θ for a conventional single-stage power converter.

FIG. 3 is a vector diagram showing the input current ($I_{in}$) leading the rectified input voltage (Vin,dc) in phase by θ for a conventional single-stage power converter. This figure shows the phase of the input current ($I_{in}$) in the presence of the EMI capacitors C1 and C2, where Ic is the current of the EMI capacitors (as discussed above), and $I_L$ is the transformer current (i.e. the current going into the transformer 115, refer to FIG. 1). As shown in this figure, the input current ($I_{in}$) leads the rectified input voltage (Vin,dc) in phase by θ degrees. This causes the power factor for the system to degrade to cos(θ) (i.e. the power factor is less than 1.0). It should be noted that the larger θ is in degrees, the lower the power factor will be (i.e. the further the power factor will be from 1.0, which is an ideal power factor).

Referring back to Equation E_1 above, it is evident that a high alternating line voltage (Vac) results in a larger capacitor current (Ic) than a low alternating line voltage (Vac). With low output power, the transformer current ($I_L$) reduces, and the phase shift between the rectified input voltage (Vin,dc) and the input current ($I_{in}$) increases, thereby making it difficult to maintain a high power factor when operating with a high alternating line voltage (Vac) and a low output power.

II. Disclosed Single-Stage Power Converter with Power Factor Correction

In order to achieve a high power factor when operating with a high alternating line voltage (Vac) and a low output power, it is necessary to compensate for the capacitor current (Ic) of the EMI capacitors C1 and C2. This can be achieved by applying a delay in phase between the peak current command (mVin,a Sin(ωt)) and the rectified input voltage (Vin,dc) such that the phase of the transformer current ($I_L$) intentionally lags behind the phase of the rectified input voltage (Vin,dc). This will result in the input current ($I_{in}$) to have a reduced phase shift with respect to the rectified input voltage (Vin,dc), thereby achieving a satisfactory power factor. The disclosed single-stage power converter with power factor correction provides a delay in phase between the peak current command (mVin,a Sin(ωt)) and the rectified input voltage (Vin,dc) to achieve a satisfactory power factor even when operating with a low output power.

Figure 4:
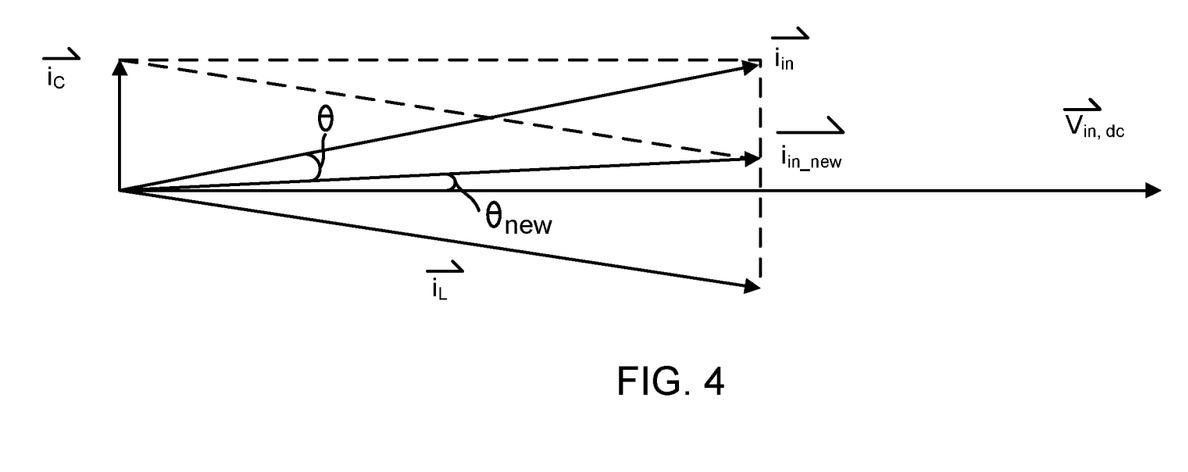
FIG. 4 is a vector diagram showing show the new input current ($I_{in\text{-}new}$) leading the rectified input voltage (Vin,dc) in phase by $θ_{new}$, which is much less than θ, for the disclosed single-stage power converter with power factor correction, in accordance with at least one embodiment of the present disclosure.

FIG. 4 is a vector diagram showing show the new input current ($I_{in-new}$) leading the rectified input voltage (Vin,dc) in phase by $θ_{new}$, which is much less than θ, for the disclosed single-stage power converter with power factor correction, in accordance with at least one embodiment of the present disclosure. As discussed above, causing the phase of the transformer current ($I_L$) to intentionally lag behind the phase of the rectified input voltage (Vin,dc) will help to compensate for the capacitor current (Ic) to achieve an improved power factor. As shown in FIG. 4, the input current ($I_{in}$) leads the rectified input voltage (Vin,dc) in phase by θ degrees. Also shown in FIG. 4, a new input current ($I_{in\_new}$), which is the vector sum of the capacitor current (Ic) and the transformer current ($I_L$), has less of a phase shift with respect to the rectified input voltage (Vin,dc) than the input current ($I_{in}$) does. As such, the new input current ($I_{in\_new}$) will provide a better power factor than the input current ($I_{in}$).

A. Analog Solution Embodiments

Figure 5:
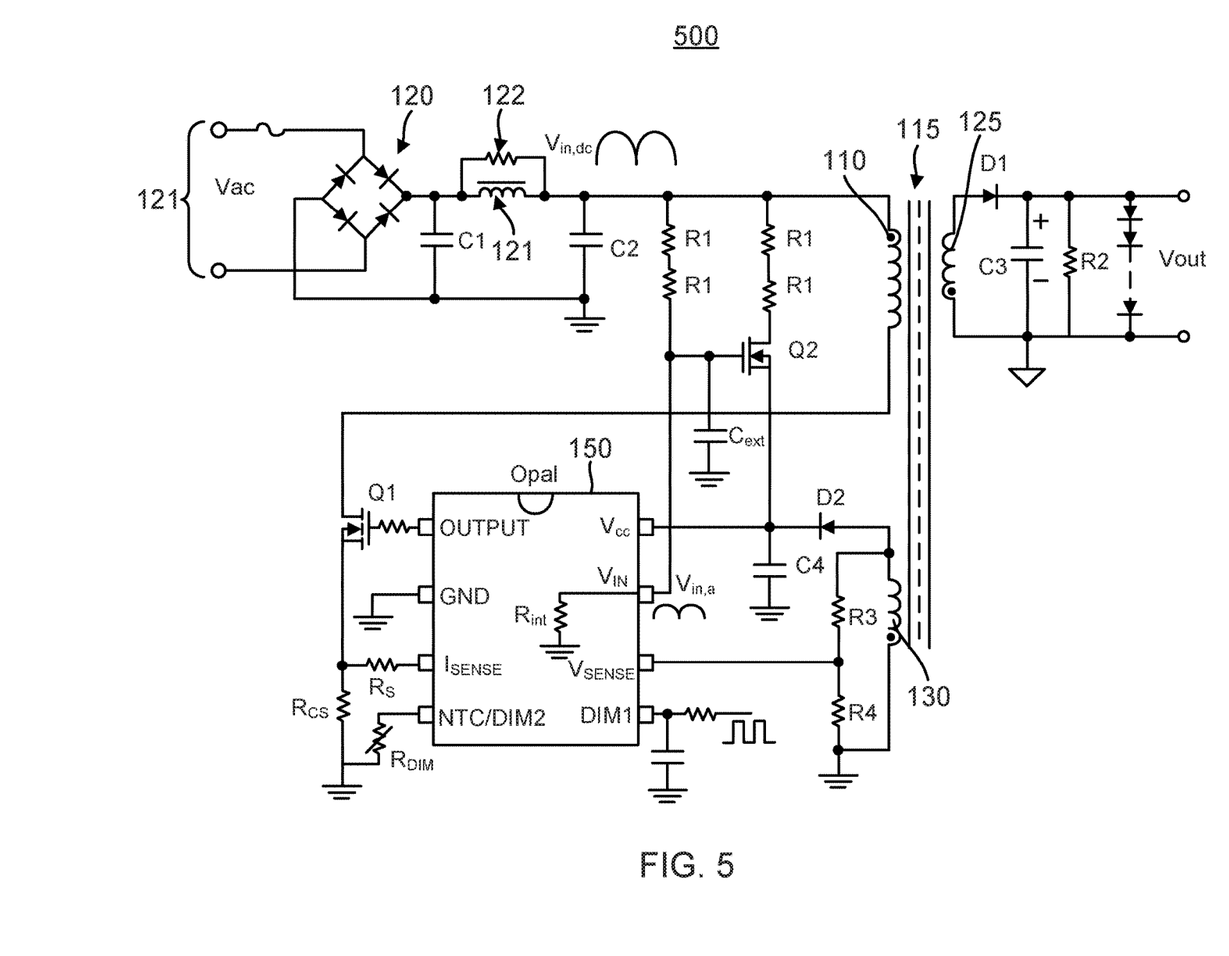
FIG. 5 is a diagram showing an exemplary circuit configuration for the disclosed single-stage power converter with power factor correction for the analog solution embodiment, in accordance with at least one embodiment of the present disclosure.

For the analog solution embodiments for the disclosed single-stage power converter with power factor correction, to generate a delay in the transformer current ($I_L$), an additional capacitor (Cext) and an additional resistor (Rint) (e.g., approximately 15 k ohms) are connected to the input voltage pin (Vin pin) of the controller 150 (refer to FIG. 5), thereby in effect forming an resistor-capacitor (RC) circuit to produce a delay. In some embodiments, the additional resistor (Rint) may be internal to the controller 150 as is shown in FIG. 5. The combination of the capacitor (Cext) and the resistor (Rint) allow for the phase of the peak current command to be delayed with respect to the phase of the rectified input voltage (Vin,dc). The delay angle is related to the resistor (Rint) and the capacitor (Cext) by: tan(δ)=ω*CextRint, where ω is equal to 2*π*(2*$f_{line}$), and $f_{line}$ is the line frequency of the AC input.

FIG. 5 is a diagram showing an exemplary circuit configuration for the disclosed single-stage power converter with power factor correction 500 for the analog solution embodiment, in accordance with at least one embodiment of the present disclosure. It should be noted that the disclosed single-stage power converter with power factor correction 500 may be practiced with any suitable single-stage power converter including, but not limited to, buck-boost converters and boost converters. An example flyback converter 500 is shown to be employed for the disclosed single-stage power converter with power factor correction 500 in FIG. 5.

In this figure, the single-stage power converter with power factor correction 500 is shown to employ an additional capacitor (Cext) as compared to the conventional single-stage power converter 100 as is shown in FIG. 1. As previously discussed above, the additional capacitor (Cext) and the internal resistor (Rint) provide a delay between the peak current command (mVin,a Sin(ωt)) and the rectified input voltage (Vin,dc) such that the phase of the transformer current ($I_L$) intentionally lags behind the phase of the rectified input voltage (Vin,dc). This will result in the input current ($I_{in}$) to have a reduced phase shift with respect to the rectified input voltage (Vin,dc), thereby achieving a satisfactory power factor even when operating with low output power.

Figure 6:
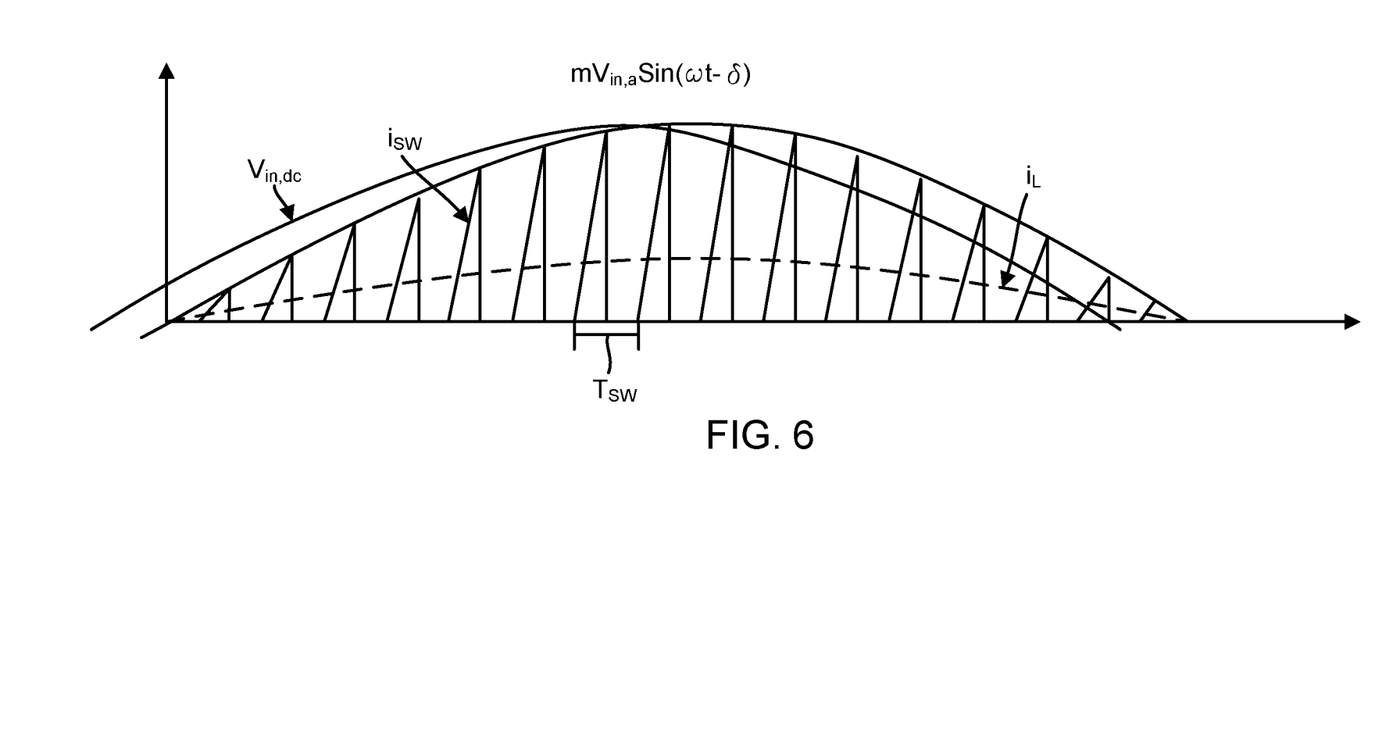
FIG. 6 is a graph showing the transformer current ($I_L$), the switch Q1 current ($I_{sw}$), and the peak current command, which is delayed in phase with respect to the rectified input voltage (Vin,dc) of the disclosed single-stage power converter with power factor correction, in accordance with at least one embodiment of the present disclosure.

FIG. 6 is a graph showing the transformer current ($I_L$), the switch Q1 current ($I_{sw}$), and the peak current command, which is delayed in phase with respect to the rectified input voltage (Vin,dc) of the disclosed single-stage power converter with power factor correction, in accordance with at least one embodiment of the present disclosure. In this figure, the phase of the peak current command (mVin,a Sin(ωt)) is shown to be delayed by δ degrees (i.e. mVin,a Sin(ωt−δ)). And, the phase of the resulting transformer current ($I_L$) is also delayed with respect to the phase of the rectified input voltage (Vin,dc) by δ degrees.

FIGS. 7A-7D are tables showing the exemplary resultant power factors (PFs) and total harmonic distortions (THDs) for various different input alternating line voltages (Vac) and dimming levels employing capacitors of various different values for the disclosed single-stage power converter with power factor correction, in accordance with at least one embodiment of the present disclosure. The tables show the effect of adding an additional capacitor (Cext) to a conventional single-stage power converter to boost the power factor to above 0.9 while operating at a low output power along with a high alternating line voltage (Vac).

Figure 7A:
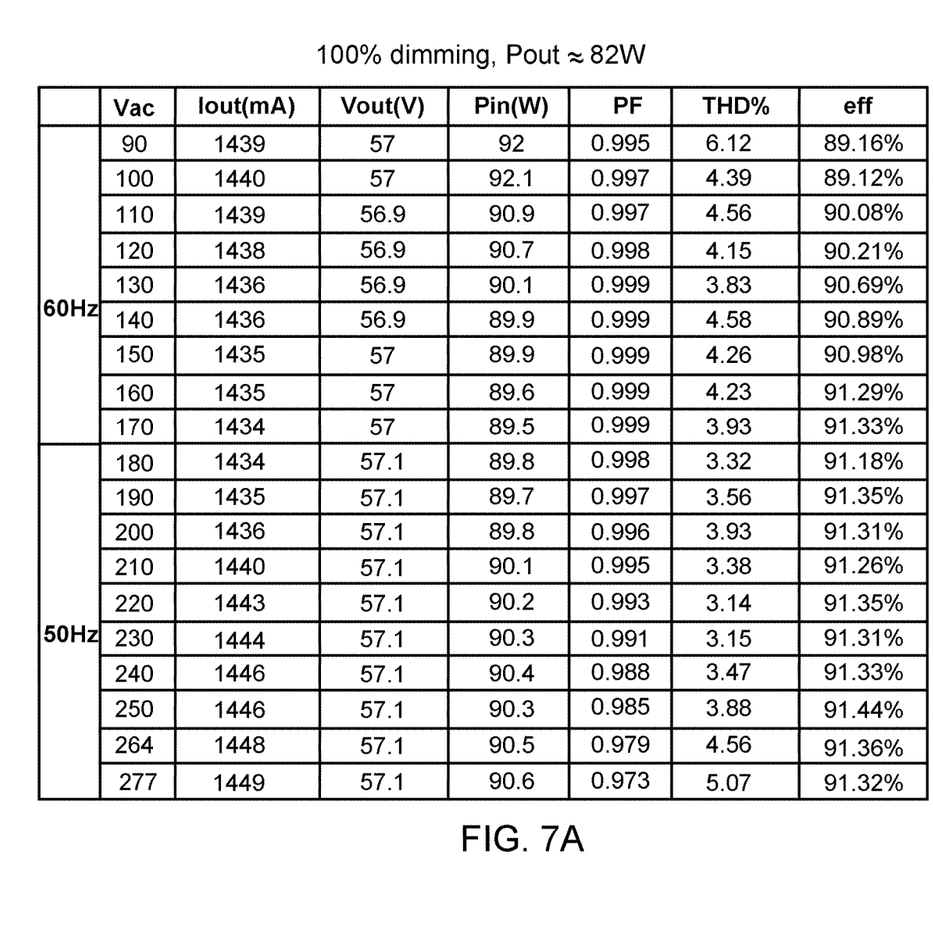
FIGS. 7A-7D are tables showing the exemplary resultant power factors (PFs) and total harmonic distortions (THDs) for various different input alternating line voltages (Vac) and dimming levels employing capacitors of various different values for the disclosed single-stage power converter with power factor correction, in accordance with at least one embodiment of the present disclosure.
Figure 7B:
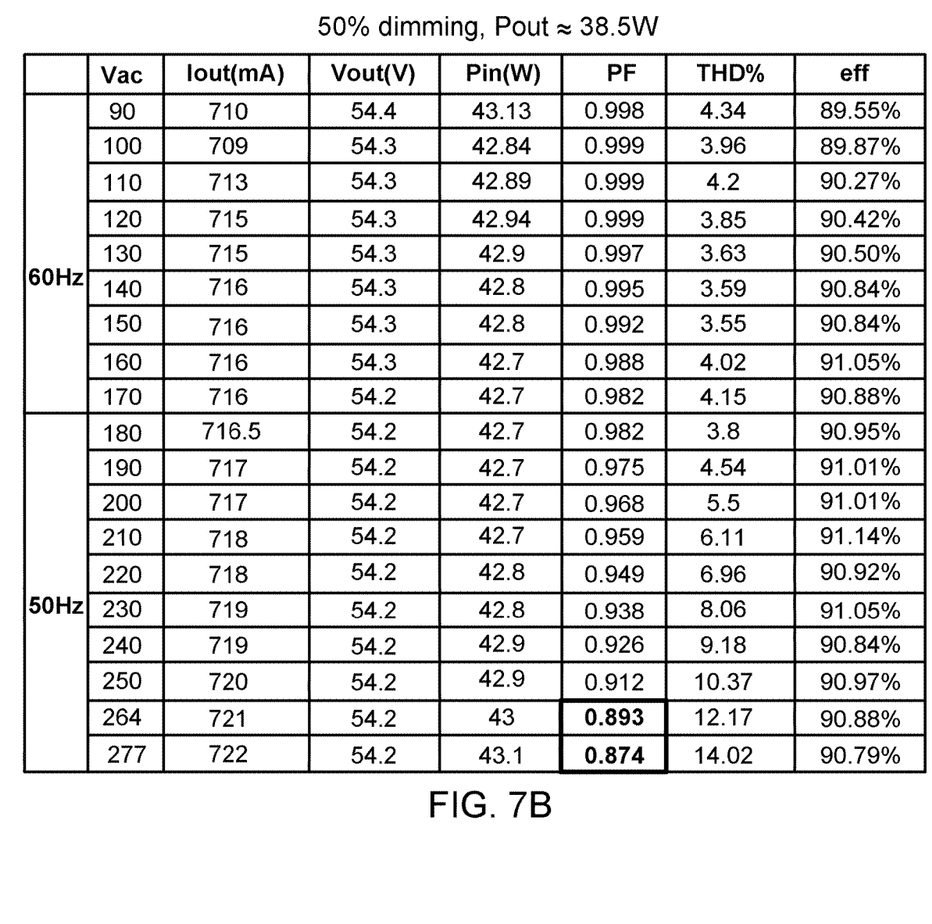

For FIGS. 7A and 7B, the capacitor value for Cext is 0.47 nanofarads (nF). For FIG. 7A, the single-stage power converter is operating at 100 percent (%) dimming with an output power of 82 Watts (W), and for FIG. 7B, the single-stage power converter is operating at 50% dimming with an output power of 38.5 W.

Figure 7C:
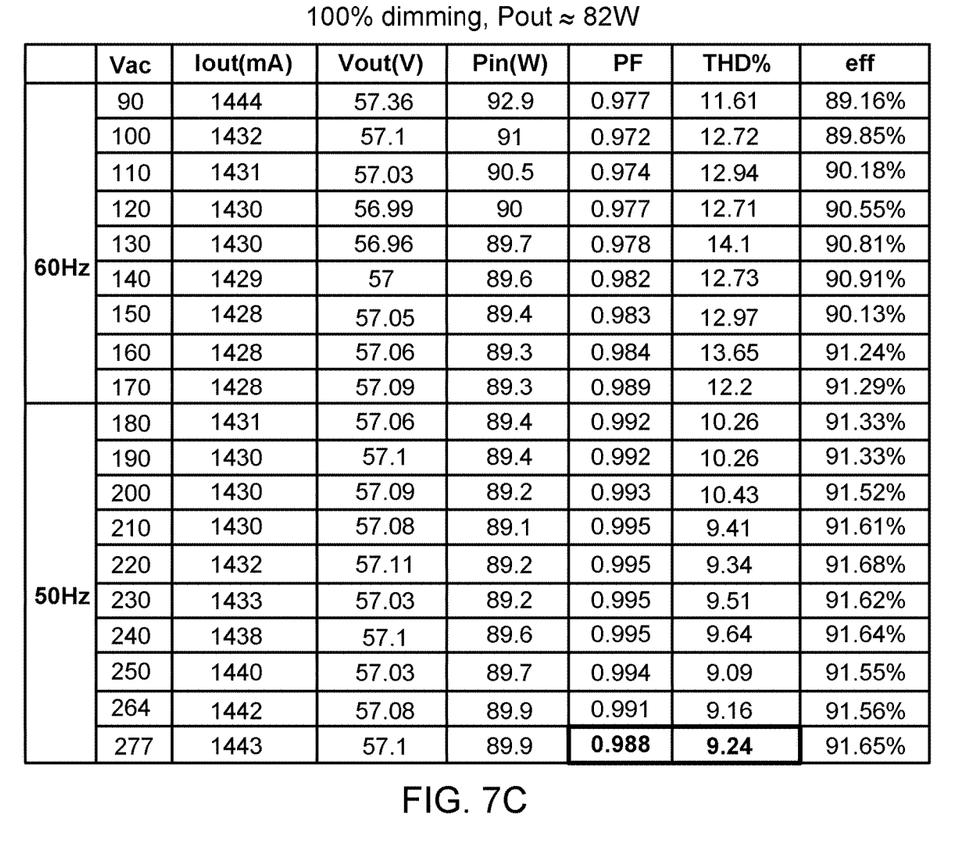
Figure 7D:
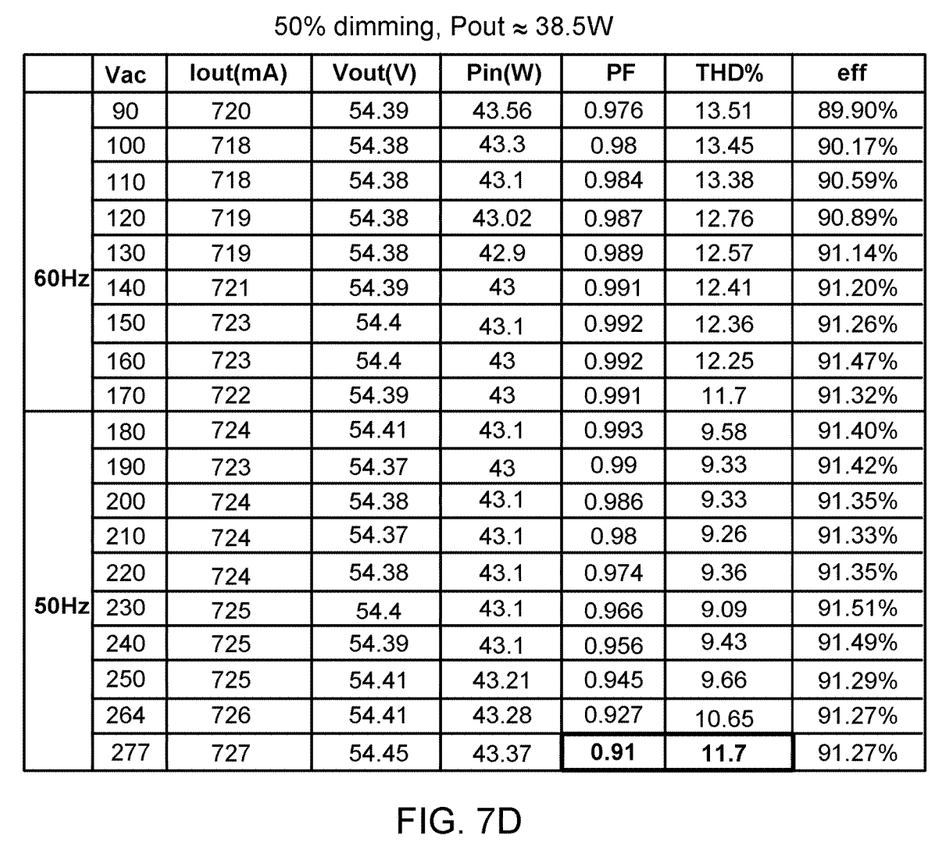

For FIGS. 7C and 7D, the capacitor value for Cext is 22 nF. For FIG. 7C, the single-stage power converter is operating at 100% dimming with an output power of 82 W, and for FIG. 7D, the single-stage power converter is operating at 50% dimming with an output power of 38.5 W.

As shown in these figures, with the employment of the additional capacitor (Cext), even when operating at a low output power, a power factor of over 0.9 can be achieved for the majority of the operating scenarios.

B. Digital Solution Embodiments

It should be noted that in other embodiments, instead of an analog solution of employing an additional capacitor (Cext) into a conventional signal-stage power converter to provide a delay between the peak current command (mVin,a Sin(ωt)) and the rectified input voltage (Vin,dc), the delay could be provided exclusively by the controller 150 (e.g., which may be implemented by an integrated circuit (IC)

chip) for a digital solution. There are three main digital solution embodiments for the controller 150 to provide the delay, which are: (1) provide the functionality of an adjustable analog-to-digital converter (ADC) with an adjustable sample-hold time which is used to sample the input line voltage (Vin,a) after a certain delay in time and adaptively vary the delay in time, (2) provide the functionality of an adjustable analog low-pass filter (LPF), and (3) provide the functionality of an adjustable digital LPF.

For the first main digital solution embodiment, the controller 150 will provide the functionality of an adjustable analog-to-digital converter (ADC) with an adjustable sample-hold time that is used to sample the input line voltage (Vin,a) after a certain delay in time and to adaptively vary the delay in time. For this embodiment, within the controller 150 an internal ADC will sample the input line voltage (Vin,a), and an internal low-pass filter (or, in some embodiments, an all-pass filter with a delay) will filter the sampled signal (sampled Vin,a) to produce a delayed signal (i.e. a delayed input line voltage (Vin,a)). Based on the input line voltage (Vin,a) and the output power level, the controller 150 will adaptively generate the necessary delay between the rectified input voltage (Vin,dc) and the sampled signal (sampled Vin,a) such that the power factor can be optimized for any given operating conditions.

Figure 8:
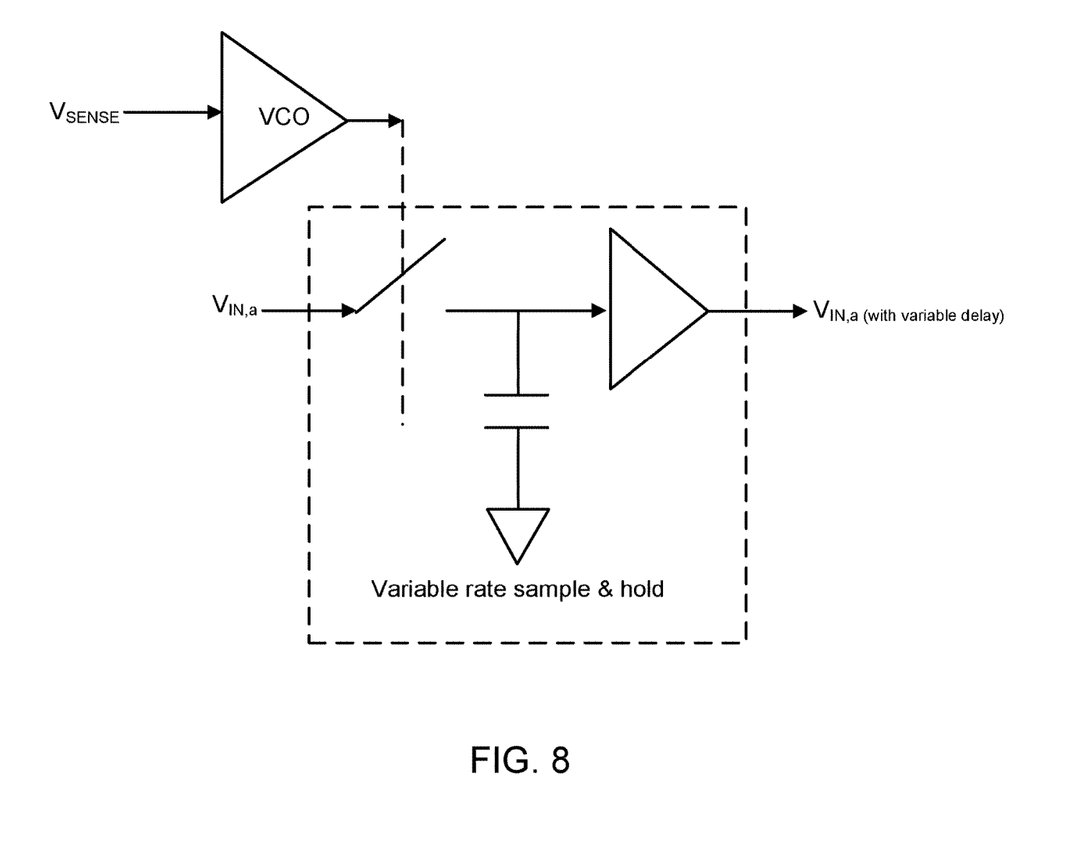
FIG. 8 is an exemplary sample and hold circuit with a variable delay that depicts the functionality that may be employed by the controller of the disclosed single-stage power converter with power factor correction for the first main digital solution embodiment, in accordance with at least one embodiment of the present disclosure.

FIG. 8 is an exemplary sample and hold circuit with a variable delay that depicts the functionality that may be employed by the controller 150 of the disclosed single-stage power converter with power factor correction for the first main digital solution embodiment, in accordance with at least one embodiment of the present disclosure. In this figure, the sample and hold circuit, which performs the functionality of an ADC sampling and delaying the input line voltage (Vin,a), is shown to include a voltage controlled oscillator (VCO), a sampling switch controlled by the VCO, a capacitor, and a voltage buffer. As previously discussed above, as the output power decreases, more phase shift in the input line voltage (Vin,a) is needed to maintain a high power factor. As shown in this figure, as the output power decreases, $V_{SENSE}$ (i.e. the voltage sensed on the voltage sense pin ($V_{SENSE}$ pin)) decreases and the voltage controlled oscillator (VCO) sampling frequency of the sampling of the input line voltage (Vin,a) decreases, thereby delaying the input line voltage (Vin,a) to maintain a high power factor. Alternatively, it should be noted that in other embodiments, the input signal to the DIM 1 pin could be used instead of $V_{SENSE}$, as is shown in this figure, to delay the input line voltage (Vin,a).

Figure 9:
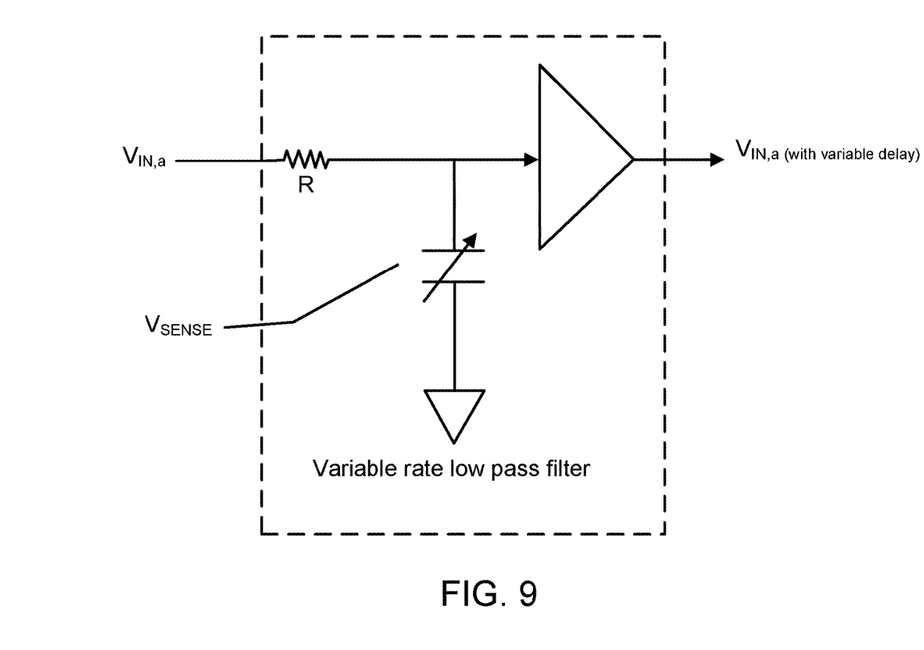
FIG. 9 is an exemplary adjustable analog low-pass filter that depicts the functionality that may be employed by the controller of the disclosed single-stage power converter with power factor correction for the second main digital solution embodiment, in accordance with at least one embodiment of the present disclosure.

For the second main digital solution embodiment, the controller 150 will provide the functionality of an adjustable analog low-pass filter (LPF). FIG. 9 is an exemplary adjustable analog low-pass filter that depicts the functionality that may be employed by the controller 150 of the disclosed single-stage power converter with power factor correction for the second main digital solution embodiment, in accordance with at least one embodiment of the present disclosure. In this figure, the analog LPF is shown to include a resistor, a variable capacitor, and a voltage buffer. As the output power decreases, $V_{SENSE}$ (i.e. the voltage sensed on the voltage sense pin ($V_{SENSE}$ pin)) decreases and $V_{SENSE}$ increases the variable capacitor capacitance to lower the LPF bandwidth, thereby increasing the delay in the input line voltage (Vin,a) to maintain a high power factor. Alternatively, it should be noted that in other embodiments, the input signal to the DIM 1 pin could be used instead of $V_{SENSE}$, as is shown in this figure, to increase the variable capacitor capacitance.

Figure 10:
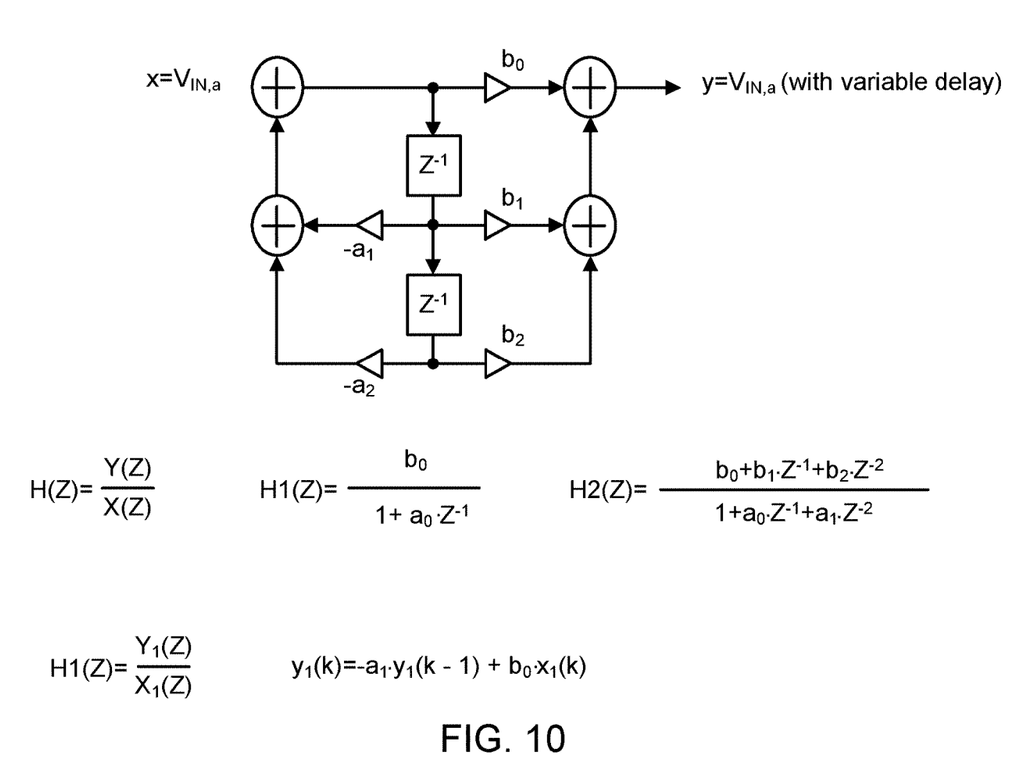
FIG. 10 is an exemplary adjustable digital low-pass filter that depicts the functionality that may be employed by the controller of the disclosed single-stage power converter with power factor correction for the third main digital solution embodiment, in accordance with at least one embodiment of the present disclosure.

For the third main digital solution embodiment, the controller 150 will provide the functionality of an adjustable digital low-pass filter (LPF). FIG. 10 is an exemplary adjustable digital low-pass filter that depicts the functionality that may be employed by the controller 150 of the disclosed single-stage power converter with power factor correction for the third main digital solution embodiment, in accordance with at least one embodiment of the present disclosure. For this embodiment, $V_{SENSE}$ (i.e. the voltage sensed on the voltage sense pin ($V_{SENSE}$ pin)) controls the filter coefficients of the equations shown on the figure. Alternatively, it should be noted that in other embodiments, the input signal to the DIM 1 pin could be used instead of $V_{SENSE}$ to control the filter coefficients of the equations shown on the figure.

As shown in the equations on the figure, H1 is a simple low-pass filter requiring only one delay, and H2 is a more complex low-pass filter that provides additional filter control, but requires two delays. The filter coefficients control the amount of delay applied to the input line voltage (Vin,a) to maintain a high power factor. The $y_1(k)$ difference equation represents an implementation of Z-transform transfer function H1(Z). The exemplary adjustable digital low-pass filter in FIG. 10 can be applied to Z-transform transfer function H1(Z) or to Z-transform transfer function H2(Z).

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for a circuit with power factor correction (PFC), the method comprising:
providing, by a combination of a resistor and a capacitor within a single-stage power converter, a delay in phase between a peak current command and a rectified input voltage such that a phase of a transformer current intentionally lags behind a phase of the rectified input voltage to maintain a power factor (PF) level and a total harmonic distortion (THD) level for the single-stage power converter.

2. The method of claim 1, wherein the resistor and the capacitor are both connected to an input voltage pin of a controller of the single-stage power converter.

3. The method of claim 2, wherein the controller is an integrated circuit (IC) chip.

4. The method of claim 2, wherein the method further comprises receiving, by the input voltage pin of the controller, an input line voltage.

5. The method of claim 1, wherein the resistor is external to a controller of the single-stage power converter.

6. The method of claim 1, wherein the resistor is internal to a controller of the single-stage power converter.

7. The method of claim 1, wherein the capacitor is connected to a start-up switch of the single-stage power converter.

8. A method for a circuit with power factor correction (PFC), the method comprising:
providing, by a controller of a single-stage power converter, a delay in phase between a peak current command and a rectified input voltage such that a phase of a transformer current intentionally lags behind a phase of the rectified input voltage to maintain a power factor (PF) level and a total harmonic distortion (THD) level for the single-stage power converter.

9. The method of claim 8, wherein the method further comprises receiving, by the controller, an input line voltage.

10. The method of claim 9, wherein the controller provides the delay in phase between the peak current command and the rectified input voltage by delaying a phase of the input line voltage.

11. The method of claim 10, wherein the controller delays the phase of the input line voltage by operating as an adjustable analog-to-digital converter (ADC) with an adjustable sample-hold time that is used to sample the input line voltage after a certain delay in time, and to adaptively vary the delay in time to achieve optimal PF and THD based on operating conditions.

12. The method of claim 10, wherein the controller delays the phase of the input line voltage by operating as an adjustable analog low-pass filter (LPF).

13. The method of claim 10, wherein the controller delays the phase of the input line voltage by operating as an adjustable digital low-pass filter (LPF).

14. The method of claim 8, wherein the controller is an integrated circuit (IC) chip.

15. A circuit with power factor correction (PFC), the circuit comprising:
a single-stage power converter; and
a combination of a resistor and a capacitor within the single-stage power converter to provide a delay in phase between a peak current command and a rectified input voltage such that a phase of a transformer current intentionally lags behind a phase of the rectified input voltage to maintain a power factor (PF) level and a total harmonic distortion (THD) level for the single-stage power converter.

16. The circuit of claim 15, wherein the resistor and the capacitor are both connected to an input voltage pin of a controller of the single-stage power converter.

17. The circuit of claim 15, wherein the resistor is external to a controller of the single-stage power converter.

18. The circuit of claim 15, wherein the resistor is internal to a controller of the single-stage power converter.

19. The circuit of claim 15, wherein the capacitor is connected to a start-up switch of the single-stage power converter.

20. A circuit with power factor correction (PFC), the circuit comprising:
a single-stage power converter; and
a controller of the single-stage power converter to provide a delay in phase between a peak current command and a rectified input voltage such that a phase of a transformer current intentionally lags behind a phase of the rectified input voltage to maintain a power factor (PF) level and a total harmonic distortion (THD) level for the single-stage power converter.

\* \* \* \* \*